United States Patent [19]
Taira-Griffin et al.

[11] Patent Number: 5,772,720
[45] Date of Patent: Jun. 30, 1998

[54] HEAT FORMED OPTICAL FIBER END FACE

[75] Inventors: Laurie K. Taira-Griffin, Huntington Beach; John S. Szalay, Corona del Mar; Michael R. Vince, Thousand Oaks; Joseph A. Wysocki, Malibu, all of Calif.; Stephen W. McCahon, Coralville, Iowa

[73] Assignee: Raytheon Company, Lexington, Mass.

[21] Appl. No.: 819,453

[22] Filed: Mar. 17, 1997

Related U.S. Application Data

[63] Continuation of Ser. No. 476,807, Jun. 7, 1995, abandoned.

[51] Int. Cl.[6] .................................................. C03B 37/15
[52] U.S. Cl. ............................ 65/387; 65/392; 264/1.26; 385/85
[58] Field of Search ........................... 65/385, 387, 392; 264/1.25, 1.26; 385/60, 62, 66, 72, 78, 81, 84, 85

[56] References Cited

U.S. PATENT DOCUMENTS

| | | | |
|---|---|---|---|
| 4,118,100 | 10/1978 | Goell et al. | 385/85 X |
| 4,191,447 | 3/1980 | Borsuk | 385/78 |
| 4,338,352 | 7/1982 | Bear et al. | 264/1.26 X |
| 4,345,930 | 8/1982 | Basola et al. | 264/1.26 X |
| 4,510,005 | 4/1985 | Nijman | 65/387 X |
| 4,547,650 | 10/1985 | Arditty et al. | 65/392 X |
| 4,678,268 | 7/1987 | Russo et al. | 264/1.26 X |
| 4,743,084 | 5/1988 | Manning | 385/85 X |
| 4,804,395 | 2/1989 | Clark et al. | 65/387 |
| 4,932,989 | 6/1990 | Presby | 65/392 X |
| 5,226,101 | 7/1993 | Szentesi et al. | 385/85 |
| 5,299,274 | 3/1994 | Wysocki et al. | |
| 5,304,228 | 4/1994 | Prince | 65/392 X |
| 5,333,223 | 7/1994 | Schofield et al. | 385/84 |
| 5,339,380 | 8/1994 | Wysocki et al. | |
| 5,408,558 | 4/1995 | Fan | 385/78 X |

FOREIGN PATENT DOCUMENTS 62-151809  7/1987  Japan .

OTHER PUBLICATIONS

U.C. Paek and A.L. Weaver, "Formation of a Spherical lens at Optical Fiber Ends with a CO2 Laser," Applied Optics, vol. 14, No. 2, pp. 294–298, Feb. 1975.

*Primary Examiner*—Curtis Mayes
*Attorney, Agent, or Firm*—Leonard A. Alkov; Glenn H. Lenzen, Jr.

[57] ABSTRACT

The end face (32) of the optical fiber (24) of a fiber optical terminal (10) is finished by installing the fiber in a terminal ferrule (18), cleaving an end of the fiber close to the end face (54) of the ferrule, and heating the cleaved fiber end face so as to soften its end face and cause it to assume a smooth, rounded configuration. The heating is accomplished, for a glass fiber, by application of the beam of a carbon dioxide laser (60) to the optical fiber end face. The heat softened end face assumes a smooth, rounded configuration that minimizes back reflection. A system including a laser (105), shutter (102), beam expander (108) and parabolic mirror (110) heats the fiber end face that is positioned at the parabola faces by a three axis manipulator (156,158) and holder (152). Orthogonal viewing systems (126, 142) enable visual monitoring of the process.

19 Claims, 4 Drawing Sheets

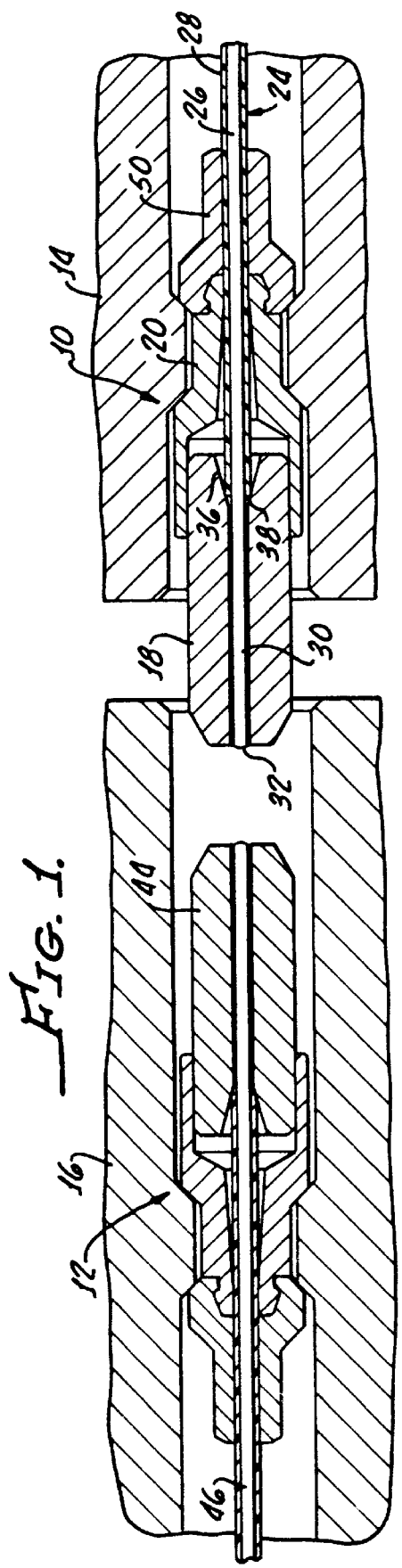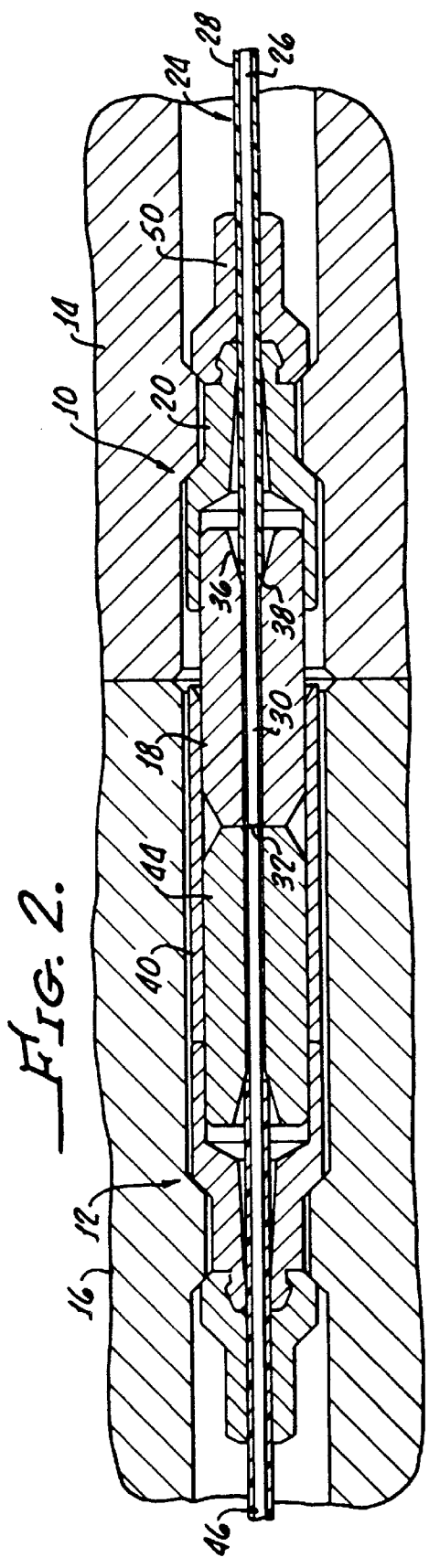

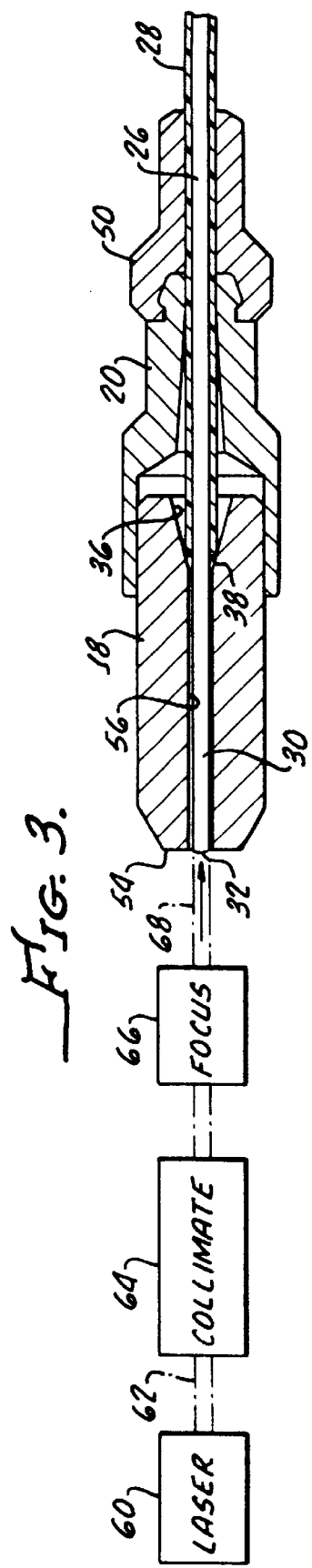
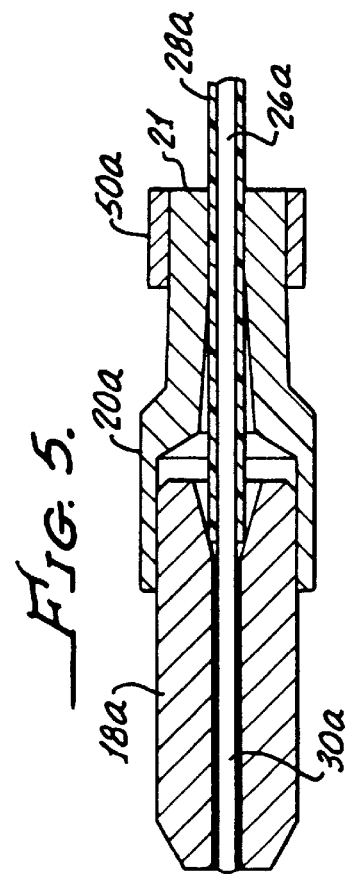
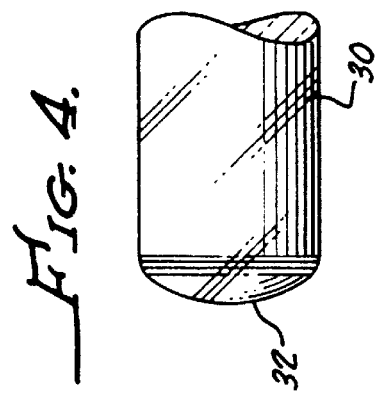

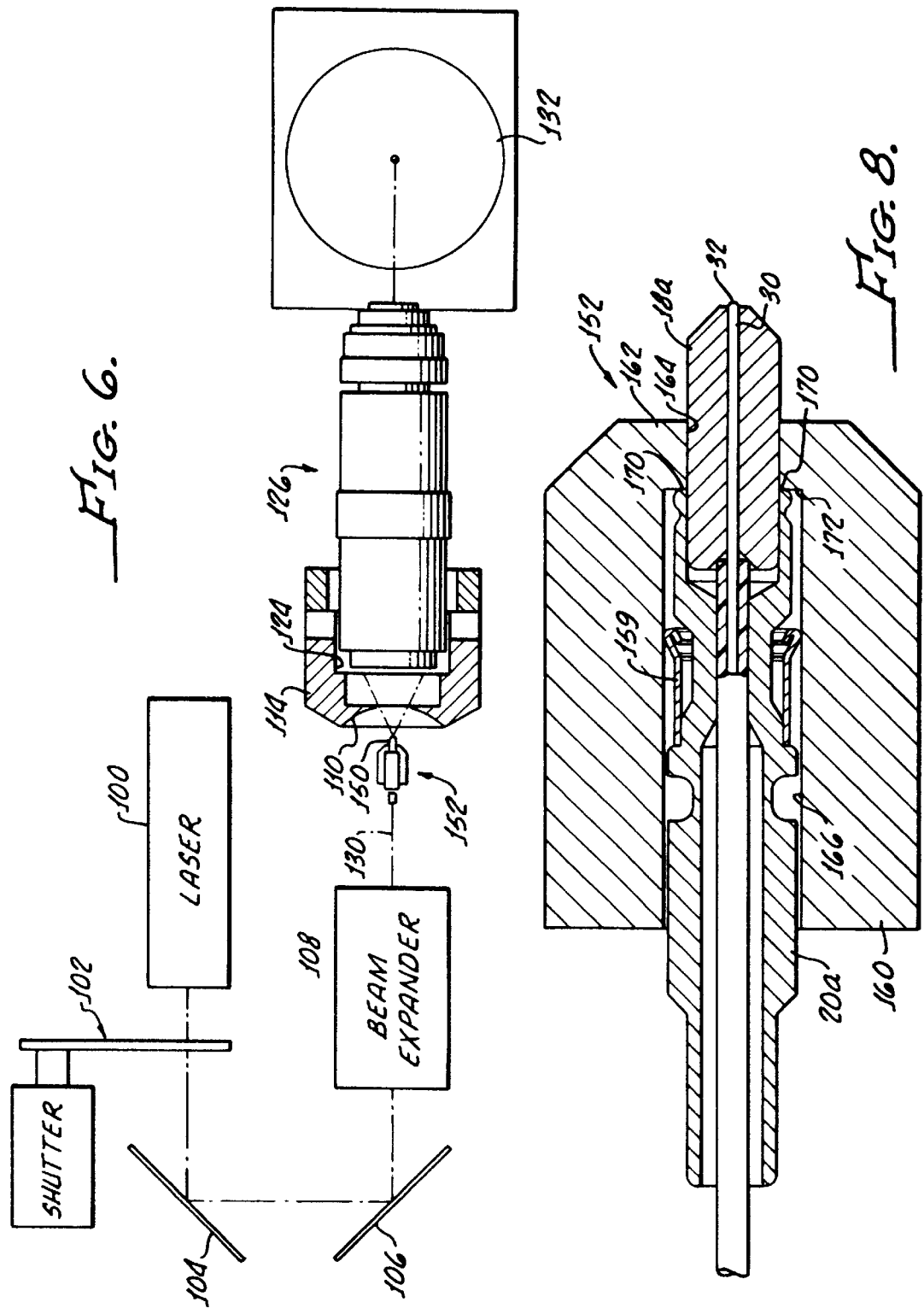

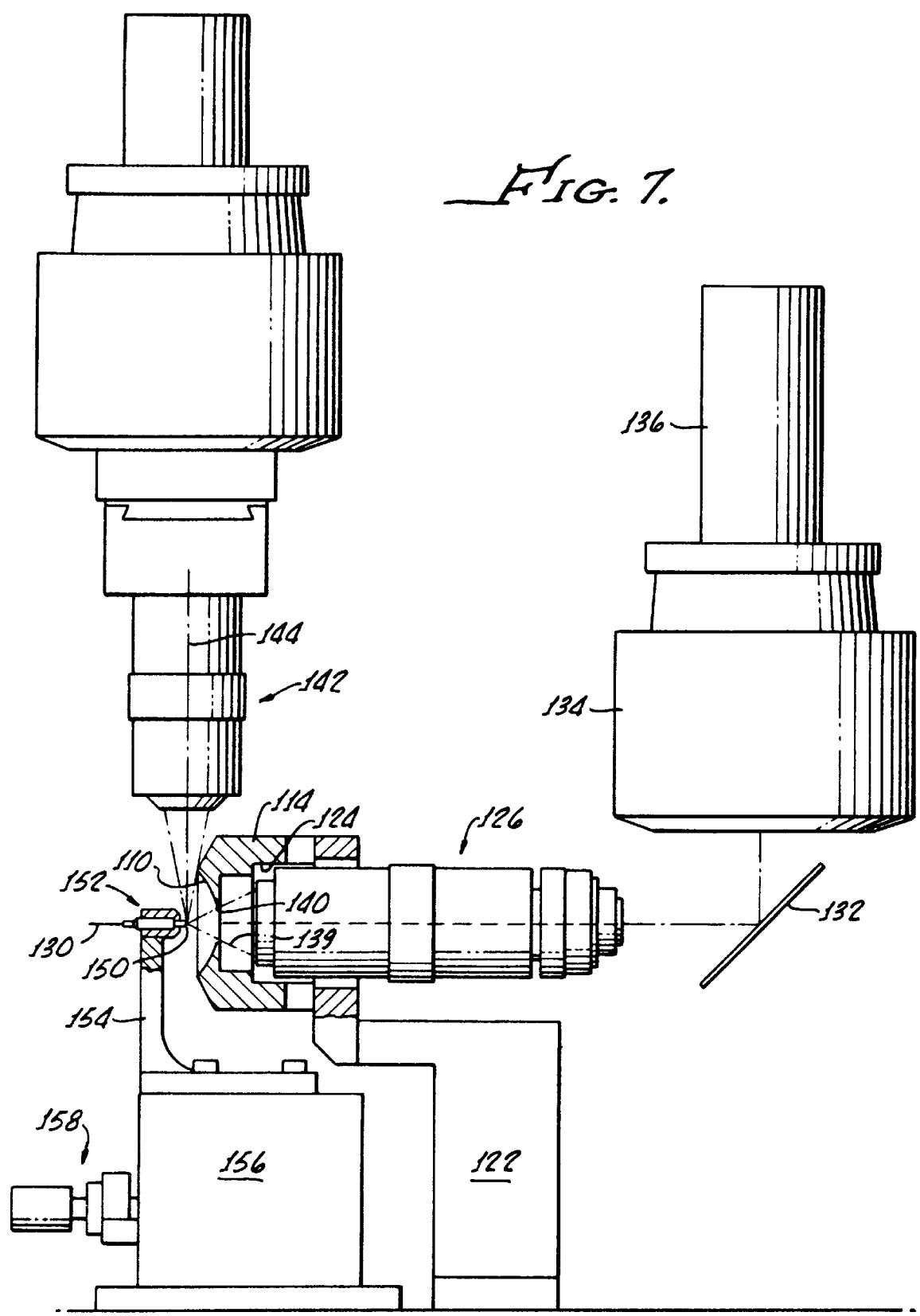

HEAT FORMED OPTICAL FIBER END FACE

This is a continuation application of Ser. No. 08/476,807, filed Jun. 7, 1995, now abandoned.

BACKGROUND OF THE INVENTION

1. Field of the Invention

The present invention relates to optical fibers, and more particularly concerns improved shaping of an optical fiber end face.

2. Description of Related Art

Optical fibers of an optical information transmitting system often are connected to one another in end to end relation by mounting the end of the fibers to be connected in optical terminals and mating the two termini so as to effectively place the end faces of the two fibers in face to face juxtaposition with little or no space between them. Light transmitted along the length of one of the fibers is internally reflected as it traverses the length of the fiber and passes through the end face of the one fiber into the adjoining fiber through its end face to be internally reflected along the length of the second fiber. To minimize back reflection from the interior of the end face of the transmitting fiber and to minimize insertion loss, e.g. the loss of signal strength in transmission from one fiber to the other, the fiber end faces preferably have a rounded configuration and are as smooth and scratch free as possible. Finishing of the end faces of the fibers is presently a laborious manual procedure which entails placing a quantity of an uncured epoxy in the passage of a zirconia terminal ferrule into which the fiber is to be inserted. The fiber is inserted into the ferrule and pushed through the epoxy at the end face of the ferrule to ensure that at least some of the epoxy is pushed out beyond the end face of the ferrule to provide a firm support for the optical fiber while it is hand-polished to smooth its face. After positioning the fiber and before polishing, the epoxy is cured for about twenty-four hours. An end portion of the fiber that protrudes from the ferrule and cured epoxy is broken off close to the end face of the ferrule. A small portion of the fiber, after being broken off, protrudes from the end face of the ferrule and is firmly supported by the cured epoxy. The epoxy also projects a small distance from the end face of the ferrule, and also supports the fiber within the ferrule passage. This rigid support for the fiber is necessary to enable it to withstand the abrasive action of an abrasive disc that has one of a predetermined number of different hardnesses. This disc is pressed against the end of the fiber to indent the disc face a small amount by the pressure of the fiber end. The disc is caused to slide over the end face of the fiber. This abrasive disc grinding is accomplished by hand and is interrupted on occasion to inspect the end face and to measure the amount of back reflection. Disc faces and disc hardness may be changed during this procedure.

Each fiber must be prepared in this manner individually, and, after the curing of the epoxy, the procedure requires anywhere from fifteen minutes to two hours to complete the fiber end face finishing. This procedure is applied to fibers of different diameter, the relatively large 50 to 60 micron diameter multi-mode fibers and the relatively small 6 to 11 micron diameter single-mode fibers. The required procedure is much more critical for the small diameter single-mode fiber because small scratches on the end face have a greater detrimental effect and the smoothness and configuration of the single-mode fiber end face are more critical.

Significant factors in the cost of this prior mode of assembly of single-mode glass fiber optic termini are the labor involved in the procedure, which may require anywhere from fifteen minutes to two hours, and the cost of the zirconia ferrule in which the fiber is mounted. Zirconia is harder than the glass fiber, is difficult to work, and causes a tendency to under-cut the fiber during polishing. The hard zirconia ferrule greatly increases the cost of the terminal, since the zirconia ferrule itself may cost several times more than all of the other material of the terminal combined. Moreover, zirconia ferrules with adequate tolerances for single-mode fibers are not readily available in this country.

Accordingly, it is an object of the present invention to provide for finishing an optical fiber end face while minimizing or avoiding above-mentioned problems.

SUMMARY OF THE INVENTION

In carrying out principles of the present invention in accordance with a preferred embodiment thereof, an optical fiber end face is smoothed and rounded by applying heat to soften the end face of the fiber. More specifically, a laser beam is directed at the fiber end face for a very short period of time to soften the end face material, causing it to assume a smooth, rounded configuration. The fiber is mounted in a ferrule without use of any epoxy and is mechanically secured thereto, as by use of a crimping sleeve or a shape memory material that radially compresses a part of the terminus body upon the exterior of the fiber.

Using the present invention a coarser grain, less expensive ceramic, such as alumina, may be employed for the ferrule to still achieve the required mechanical tolerances but without the need for the hard zirconia ferrule material previously needed to resist abrasion in the prior art end face finishing procedure. The present method of finishing a single-mode optical fiber optic terminal by heat softening and forming its end face can be accomplished in minutes instead of requiring an overnight procedure.

The new procedure is a great improvement over prior techniques and produces a high quality focusing surface directly on the fiber end face. The prior art procedure is a manual grind and polishing method that is time-consuming, labor intensive, operator dependent and allows only a minimal amount of re-work. Utilizing the laser heat softening process of the present invention not only polishes the end but provides the desired slightly spherical radius on the end of the fiber, eliminating labor and material required to epoxy and polish, as well as eliminating lengthy training time for polishing operators and also eliminating risks of degraded optical performance. Moreover, tests of a fiber end face that has been finished according to principles of the present invention show that insertion loss at the end face is less than insertion loss for a fiber finished with the conventional grind and polish procedure.

The invention also includes apparatus for accomplishing the fiber end face processing. The apparatus employs a parabolic mirror concentrating a laser beam at its focus, together with a fiber holder that positions the fiber with its end face at the parabola focus and directly facing the parabola reflective surface.

The apparatus permits in-situ monitoring of the fiber end face in its holder at the parabolic mirror focus while focusing the laser beam on the fiber end face. The apparatus and process result in increased repeatability and processing control that derive from the unique symmetry of the heating process and in-situ monitoring during lens formation. The arrangement offers repeatability and good process control which result directly from the unique optical system used to heat the fiber coupled with the in-situ monitoring capability.

BRIEF DESCRIPTION OF THE DRAWINGS

In the accompanying figures:

FIG. 1 illustrates a pair of unmated fiber optic termini;

FIG. 2 shows the optic termini of FIG. 1 in mated condition;

FIG. 3 illustrates a single optical fiber terminal having the fiber optic end face being heat softened with a laser beam;

FIG. 4 is an enlarged showing of a exemplary end face configuration that results from application of a laser beam;

FIG. 5 illustrates an alternative shape memory sleeve for securing the fiber to the terminus body;

FIG. 6 is a schematic plan view of a system that employs a parabolic mirror for directing a laser beam at the fiber end face;

FIG. 7 is an elevational view of portions of the system of FIG. 6; and

FIG. 8 is an enlarged detailed showing of a fiber, ferrule and terminus body mounted in a holder of the system of FIGS. 6 and 7.

DESCRIPTION OF THE PREFERRED EMBODIMENTS

Illustrated in FIG. 1 are first and second fiber optical termini 10 and 12, each mounted in a connector part 14,16, which are arranged to be connected to one another in any suitable manner so as to achieve a mated configuration, as is shown in FIG. 2. The two fiber optic termini are used in an optical information transmitting system in which information bearing optical signals are transmitted along optical fibers and from one optical fiber to another optical fiber or to some other optical device. The two termini may be identical so that a description of one will suffice to describe both. Terminal 10, for example, includes an end ferrule 18 fixedly secured as by a press fit within a terminus body 20. The ferrule and body 20 are each formed with coaxial longitudinal through passages that receive an optical fiber, generally indicated at 24. The fiber includes a clad core 26466 and a protective covering or buffer covering 28. The fiber is formed, as is well known, with an optical core having a thin cladding with a slightly different index of refraction so as to provide total internal reflection for light transmitted internally along the length of the fiber. The core and cladding are formed of glass (preferred in this invention) or an optical plastic. The buffer covering provides protection for the clad core. The optical fiber includes an end section 30, having an end face 32, which is the face that is to be formed for optimum transmission of light from the one fiber to the other. Ferrule 18 includes a counter-sunk rearward end 36 at which end the buffer covering 28 is terminated. Thus the buffer covering has an end 38 that abuts a portion of the tapered counter-sink 36 to form a stop for the fiber as it is inserted into the terminus body and ferrule, from right to left as viewed in FIG. 1 for terminal 10.

An alignment sleeve 40 (FIG. 2) is secured over the end of ferrule 44 of the terminal 12 prior to mating the two terminals with one another. During the mating, the end of terminal 12, together with the alignment sleeve, enters the recess of connector part 14 that surrounds the ferrule 18 of terminal 10. Ferrule 18 enters a projecting end of alignment sleeve 40 so that the final assembled configuration is as illustrated in FIG. 2 with the alignment sleeve ensuring proper alignment of the two fibers in end to end coaxial arrangement. The two connector parts 14,16 are secured to one another by any suitable means well known to those skilled in the art to hold the two ferrule end faces in abutment with each other or slightly spaced apart axially.

Assume that light is transmitted from right to left in FIGS. 1 and 2. In order to provide low loss transmission of light from one fiber to the other, the configuration and smoothness of the fiber end faces must be controlled. It is important that the end face of light transmitting fiber 24 be non-planar, or, more specifically, be convexly rounded with a partly spherical shape so as to minimize reflection from the interior of this end face back toward the light source (not shown), toward the right end of fiber 24, as seen in FIG. 1. Not only must this end face be properly rounded, but it must be as smooth as possible and free of scratches or other defects or surface discontinuities. To accomplish this, according to principles of the present invention, a unique arrangement is employed for heating and softening the fiber end face so as to cause it to soften and effectively flow naturally to a rounded, party spherical, smooth configuration.

In assembly of the fiber illustrated in FIG. 3 a crimping sleeve 50 in uncrimped condition (the sleeve 50 is shown in crimped condition in FIG. 3) is placed over the end of terminus body 20, which itself has been fixedly secured, as being a press fit on the rear end of ferrule 18. An end section of the fiber buffer cover 28 is removed to form an end of the buffer cover, indicated at 38. The unbuffered end 30 of the fiber is then slid from right to left, as shown in FIG. 3, through the uncrimped crimping sleeve, through the terminus body 20, and through the ferrule 18, all of which are provided with coaxial passages just slightly greater in diameter than the optical fiber, until an uncovered end of the fiber protrudes a significant distance beyond the end face 54 of the ferrule 18. Conveniently, the end 38 of the buffer cover, which has a diameter greater than the diameter of the passage 56 in the ferrule 18 but less than the diameter of the passages in terminus body 20 and crimp sleeve 50, abuts a portion of the counter-sunk rear end 36 of the ferrule 18 and stops further insertion of the fiber. No epoxy is needed or used. Crimp sleeve 50 is crimped to cause it to exert radially inwardly directed compressive forces upon the terminus body 20, which then grasps the clad and buffered fiber to securely affix the fiber within the ferrule and terminus body.

With a section of the unbuffered fiber protruding from the end of the ferrule 18, a diamond knife is used to scribe a line or a nick on the exterior of the clad fiber at a distance of approximately 10 to 20 microns beyond the end face 54 of the ferrule. The fiber is then broken off at this scribed line or nick and presents an unfinished end face. The fiber now is in condition to have its end face finished.

Now a laser 60 is caused to send a light beam 62 through a suitable collimator 64 and a focusing device 66, such as a parabolic reflector or focusing lens, to direct a laser beam 68 along the longitudinal axis of the fiber directly to the fiber end face 32.

The optical fiber may be either glass or an optical plastic. Where the optical fiber is a glass fiber, it is preferred to employ a laser having a wavelength in the order of about 10.5 to 10.7 microns so as to have maximum and most efficient heating effect upon the glass of the fiber. An exemplary laser useful in the practice of the described end face finishing method is a Model 48-0-115 Carbon Dioxide Laser made by Synrad Company. The laser is capable of outputting a beam in the order of 6 watts. However, it is found that an output power in the order of about 2 watts is sufficient when applied to the fiber end face for a period of time between one and two seconds.

The laser beam heats the end face of the optical fiber and causes it to soften but not completely melt. The softened end face then naturally flows to a smooth, rounded, partly spherical configuration. The fiber end hardens in this configuration upon removal of the laser heat. The end finishing is now completed.

The described end finishing needs no epoxy, no waiting for epoxy to cure, no laborious carefully controlled hand grinding with different hardness grinding pads and with different abrasive pads, and may be completed in a few seconds. The end face is smooth, scratch-free and has a desired rounded shape. Tests have shown that the described laser end face finishing provides better light transmission. It is found that the heat formed end face has a significantly lower insertion loss in transmission of light.

To ensure that the laser beam is directed coaxially of the fiber axis, a suitable terminal support (not shown in FIG. 3) may be mounted in fixed relation to the laser equipment, although satisfactory results have been obtained with an adjustably position laser. A specific terminal support and parabolic focusing mirror are described below and illustrated in FIGS. 6–8.

FIG. 4 is illustrative of the resulting configuration of the optical fiber end face after being heat-softened with the carbon dioxide laser beam.

Illustrated in FIG. 5 is a modified terminal in which the crimping sleeve is replaced with a shape memory sleeve. Except for the difference in sleeves that hold the fiber to the terminus body, all of the parts of FIG. 5 are the same as the parts shown in FIGS. 1 through 3. The fiber of FIG. 5 is similarly prepared, inserted and subjected to the carbon dioxide laser beam for end face finishing. Thus, a fiber 26a, having a buffer covering 28a, has an end section 30a that is stripped of its buffer covering. The stripped section of the fiber extends through the ferrule 18a, which is fixedly secured, in the terminus body 20a. The buffer covered fiber extends through the elongated passage of the terminus body 20a, which has a necked-down rear end section 21. Section 21 is encircled by a sleeve 50a which is formed of a shape memory material. A shape memory material is a material which if mechanically deformed while it is below a specific temperature will return to a predetermined shape when the temperature is raised. The sleeve may be made out of a nickel titanium alloy shape memory metal, such as the alloy sold under the trademark Tinel by Raychem Company.

In use of the shape memory sleeve the sleeve is cooled to a low temperature and, while at the lower temperature, deformed by enlarging it. The enlarged cold sleeve is then slid over the necked-down section 21 of terminus body 20a after the buffered covered fiber has been installed into the ferrule and terminus body. Upon warming to room temperature the shape memory sleeve 50a contracts and exerts radially inwardly directed compressive forces on the small diameter terminus body sleeve section 21 to thereby securely hold the buffer covered fiber in the ferrule. The shape memory sleeve is preferred to a crimping because an inwardly directed compressive force that is more uniform over and around the entire circumference of the fiber is provided by the temperature induced change of shape. The crimp sleeve or shape memory sleeve is sufficient to hold the fiber in the terminal without use of epoxy or other holding arrangements.

The described heat softening end face finishing of the optical fiber has many advantages. In addition to simplicity and significant time savings of the procedure, is the fact that a wide variety of materials for forming the ferrule 18 becomes available. With the prior art method of hand-polishing the end face of the fiber while it is secured in an epoxy at the ferrule end face, it is important that the polishing does not abrade the end face of the ferrule itself. As the polishing pad of the prior art is moved over the end face of the fiber it also tends to abrade the end face of the ferrule. For this reason the prior art ferrule itself must have abrasive characteristics that make it more resistent to abrasion than the optical fiber. Heretofore the ferrule has commonly been made of zirconia, a material that is harder than glass. This is a fine grain ceramic material that is not only very expensive but is difficult to work and not widely manufactured in the United States. However, because use of the heat softening end face finishing method of the present invention causes no abrasion of the ferrule end face, the ferrule may be made of a softer, less expensive material. A zirconia ferrule is not required. Thus, when using the methods of the present invention the ferrule may be made of alumina, which is a significantly cheaper and more widely available ceramic. Other possible ferrule materials include thermoplastic and liquid crystal polymers, each of which is preferred to zirconia for ease of manufacture. These ferrule materials need not be harder than glass.

Although the fiber has been described as being installed in the ferrule and then having its end manually scribed or nicked and broken off to protrude some 10 to 20 microns from the ferrule end face, it is contemplated that a tool may be utilized for automatically breaking the fiber. Such a tool is initially secured to the ferrule, grasps the fiber to put it under tension, then scribes and breaks the fiber at the appropriate 10 to 20 micron distance from the ferrule end face.

FIGS. 6, 7 and 8 illustrate a positive focusing parabola system that facilitates application of the laser beam to the end of the optical fiber and enables the process to be visually monitored. The system is analogous in some respects to the fiber splicer shown in U.S. Pat. No. 5,299,274 in which two fibers that are to be spliced have their ends butted against each other at the focal point of a parabolic mirror which directs to its focal point the light of a heating laser that sufficiently heats the abutting end faces to cause fusion of the two fibers. The system of this patent is not concerned with end finishing, but only relates to fusion splicing. The arrangement of the present invention places only a single fiber end at the parabola focus and faces the end of this single fiber directly at the parabola reflective surface without obstruction.

As shown in FIG. 6 apparatus for fiber end face finishing embodying principles of the present invention includes a laser 100 such as the carbon dioxide laser mentioned above which sends a laser beam past a shutter arrangement 102 to be reflected at 90 degrees by a first turning mirror 104 to a second turning mirror 106 that turns the beam a second 90 degrees to be directed through a beam expander 108 that expands the diameter of the laser beam. The expansion may increase the beam size to about 1½" in diameter. The expanded beam is then directed at a surface 110 of a parabolic mirror mounted in a mirror holder 114 that itself is carried on an optical bench by a mirror support structure 122 (FIG. 7).

Also, mounted to the parabolic mirror holder 114 in a rearwardly facing recess 124 thereof is an optical viewing lens system 126 which provides a visual line of sight directed along the axis 130 of the parabolic mirror toward the parabola focal point. The line of sight of lens system 126 is bent through 90 degrees by means of a turning mirror 132 and then passes through a set of viewing optics 134 including an eye piece 136.

An aperture 140 in the center of the parabolic mirror 110 allows the visual line of sight 139 of the viewing optical system 126, 132, 134, 136 to pass through the mirror surface along an axis coincident with the axis 130 of this parabola. A second optical viewing system 142 is positioned with its optical axis 144 at right angles to the axis 130 of the parabola and has a visual line of sight that just clears the forward edge of the parabolic reflector. Both of the viewing optical systems 142 and 126 are focused at the focal point 150 of the parabolic surface 110.

Interposed between the beam expander 108 and the parabolic mirror 110 is a fiber holder 152 that detachably and securely carries and positions an optical fiber with its ferrule and terminus body so that the end face of the fiber, namely the face to be end polished, is positioned at the focal point of the parabolic mirror and directly faces the mirror. The optical viewing systems 142 and 126 are positioned so that each is focused at the parabola focal point (and the fiber end face) and each can view the end face of a fiber held in holder 152. Viewing system 126 has its line of sight 139 co-axial with the axis of a fiber held in the holder (and with the parabola axis).

Holder 152 is mounted on an upstanding carrier arm 154 (FIGS. 7 and 8) that in turn is carried by a controllable three axis manipulator stage 156 a three axis drive arrangement 158. The stage 156 and drive 158 enable adjustment of the holder 152, and a fiber mounted therein, in three mutually orthogonal axes to ensure positioning of the fiber end face precisely at the parabola focal point.

As can be seen in FIG. 8, an optical fiber, after being mounted in its ferrule, which in turn is secured to the terminus body, is firmly but detachably positioned in holder 152. The fiber may be mounted in a connector part of slightly modified configuration including a ferrule 18a and a terminus body 20a, each corresponding to and functioning the same as ferrule 18 and body 20 of FIGS. 1 and 2. A cylindrical spring clip 159 has one end fixed to body 20a and presses radially outwardly against inner walls of the holder 152 when the fiber and its mounting parts are slidably inserted into the interior of holder 152. The holder 152 includes a short cylindrical hollow head 160 having a forward end wall 162 that is apertured, as at 164, to snugly receive the exterior surface of ferrule 18a. The holder includes an interior bore 166 that slidably receives the cylindrical clip 159 on the exterior surface of terminus body 20a to precisely position the ferrule fiber and body radially of the holder. The fiber ferrule and terminus body are positioned axially of the holder by abutment of a forward end 170 of the terminus body with the inwardly facing surface 172 of holder end wall 162. Spring 159 frictionally holds the ferrule end terminus body and enables the fiber, ferrule and terminus body to be readily inserted and readily withdrawn from the holder. Thus the fiber, ferrule and holder are repeatably and precisely positioned axially and radially within the holder, and firmly held in place when so positioned.

The apparatus illustrated in FIGS. 6, 7 and 8 enables precision and repeatable performance of the laser end face finishing process described above and produces a high quality positive focusing lens on the fiber end face. The fiber end face may be monitored before, during and after the finishing process. Because of the efficiency of the described system a laser of as little as 0.5 watts in power may be employed. The amount of heating applied is controlled by the length of time the shutter 102 is open to allow the laser beam to illuminate the fiber end face. The laser beam, when expanded to about 1½", has a much greater cross sectional area than the area of the holder so that the holder (and its contents) effectively shadows only a small part of the central portion of the parabolic reflector 110. Holder support arm 154 is made sufficiently narrow to minimize its shadow on the parabolic reflector. The expanded laser beam, which is co-axial with the axis of the holder and therefore is co-axial with the axis of the fiber mounted in the holder, illuminates the face of the parabolic reflector except for the small central portion that is occluded by the fiber and holder. The laser light is reflected by the parabolic surface directly to its focal point at which is precisely positioned the fiber end face 32.

The viewing systems 142 and 126 are operable during the application of the laser light to the fiber end face. They also may be used prior to application of the light to the laser end face to ensure proper positioning of the fiber end face at the parabolic focal point. When the fiber, its ferrule and terminus body, are inserted into the holder (and before the laser pulse is applied) the fiber end face is viewed through one or both of the viewing systems. The three axis positioning stage 156, 158 is operated to obtain precise positioning of the end face at the focal point. The holder configuration and support insure alignment of the fiber axis with the parabola axis. After completion of processing and formation of the finished curved fiber end face the optical viewing system is employed to evaluate the end face finishing. This viewing is used to empirically adjust various parameters including laser power, laser pulse duration shutter speed and other factors such as alignment to the focal point of the parabolic mirror. Laser power and pulse duration are varied to accommodate end face finishing of fibers of different materials or of different diameters. For example, a 125 micron diameter glass fiber may be completely finished by a single one milli-second pulse from a 0.25 watt laser.

Adjustment may be made for the first several fibers that are end face finished. This is used as an empirical calibration and determination of various laser parameters. The process, result and effectivity of adjusted parameters is determined by visually observing and analyzing the finished end face. After making suitable adjustments to parameters used for successive ones of the first few fibers, appropriate parameters of the system for producing an optimum end face have been determined and are utilized thereafter without additional visual inspection. Nevertheless, the visual viewing equipment remains in position and may be utilized to visually check each fiber that has its end face finished as described herein.

Although a specific holder configuration has been shown and described for a particular fiber connecting part, using a specific ferrule and terminus body, it will be readily appreciated that for use with other fibers and other shapes and sizes of connecting parts, the size and/or configuration of the holder may be varied.

A significant advantage of the described system is the availability of direct viewing and visual monitoring of the completed end face, e.g., direct visual observation of the positive focus microlens that is formed on the fiber end. The processing is simple and rapid, requiring neither extra materials nor highly skilled technical personnel. Core dimensions are not changed and the system is relatively easy to control and highly repeatable. Axial symmetry is greatly enhanced because of the physical configuration and adjustability of the holder. The system produces a high quality positive focusing lens on the fiber end with a low degree of processing, using simple and rapid techniques.

What is claimed is:

1. A method for finishing the free end of an optical fiber that is to be used in an optical information system wherein an optical signal is transmitted through said optical fiber to another optical device, said method comprising forming a rounded end on said optical fiber by applying heat to soften and shape the end face of said optical fiber, said step of applying heat comprising directing a laser beam directly to the end face of said optical fiber, said step of directing a laser beam at the end face of said optical fiber compromising the steps of providing a parabolic reflector having a focal point, positioning said free end of said optical fiber at said focal point and reflecting an expanded laser beam from said parabolic reflector to said free end of the optical fiber.

2. The method of claim 1 wherein said parabolic reflector has an optical axis and including the step of positioning said optical fiber with its axis aligned with the optical axis of the parabolic reflector, and including the step of viewing said end face of said optical fiber at said parabolic reflector focal point along a line of sight coaxial with said optical fiber.

3. The method of claim 1 wherein said step of positioning said optical fiber comprises the step of mounting said fiber in a three axis manipulator stage, and actuating said manipulator stage to position and orient said optical fiber.

4. The method of claim 1 wherein said optical fiber is a glass fiber, and including the step of inserting an end section of said optical fiber into and through the passage of a ferrule having a terminal end face, severing an end portion of said optical fiber end section to provide an optical fiber end face, said step of directing a laser beam comprising directing a carbon dioxide laser beam to said optical fiber end face to form a smooth, rounded configuration on said end face.

5. The method of claim 4 including the step of securing the optical fiber to said ferrule at a portion of the ferrule remote from said fiber end face.

6. The method of claim 5 wherein said step of securing comprises securing a terminus body to said ferrule and positioning a shape memory sleeve on said terminus body.

7. The method of claim 5 wherein said step of inserting the fiber comprises the step of inserting the fiber through the ferrule to provide an end section thereof extending beyond an end face of said ferrule, and cleaving said fiber to provide a cleaved fiber end at an end face of said ferrule, said step of heating an end face of said fiber comprising directing a laser beam at said cleaved fiber end to produce a smooth, partly spherical shape on the cleaved end face of the fiber.

8. A method of finishing the end face of an optical fiber for use in an optical information system wherein an optical signal is transmitted from said optical fiber to another optical device, said method comprising the steps of:
providing a parabolic reflector having a focal point,
mounting an optical fiber in a holding device with an end face of the fiber at said focal point,
heating and softening said end face of the fiber and allowing the softened end face to naturally flow to a smooth rounded configuration to form a smooth, rounded end face on the fiber, and viewing said end face through said reflector.

9. The method of claim 8 wherein said step of heating comprises applying a laser beam to said end face of the fiber while the end face is free of contact with another object.

10. The method of claim 9 wherein said step of mounting the fiber comprises the steps of inserting the fiber into a ferrule and securing the fiber to the ferrule.

11. The method of claim 10 including the step of providing said optical fiber as a fiber comprising a core and cladding encased in a buffer covering, removing the buffer covering from an end section of said fiber to provide an unbuffed forward fiber section, inserting said fiber and said forward fiber section through said ferrule, and cleaving said forward fiber section at an end face of said ferrule to form a cleaved fiber end face, said step of applying a laser beam to said fiber comprising applying said laser beam to said cleaved fiber end face of said fiber.

12. The method of claim 10 wherein said step of holding comprises mounting the ferrule in a terminus and encircling said terminus with a sleeve having a shape memory.

13. The method of claim 8 wherein said optical fiber is a glass fiber and wherein said step of heating comprises heating said end face of the fiber with the beam of a carbon dioxide laser.

14. A method of finishing the end face of an optical fiber for use in an optical information system wherein an optical signal is transmitted from said optical fiber to another optical device, said method comprising the steps of:
mounting an optical fiber in a holding device, and
heating an end face of the fiber to form a smooth, rounded end face on the fiber,
said step of heating compromising providing a parabolic reflector having a reflector axis and a reflector focal point, positioning said fiber and holding device in front of said reflector with said fiber facing said reflector and positioned at said focal point and with the axis of said fiber aligned with said reflector axis, directing a laser beam along said reflector axis past said holding device and fiber toward said reflector to be reflected from said reflector to said focal point and to said fiber end face, and viewing said end face through said reflector.

15. A method for finishing the free end of an optical fiber that is to be used in an optical information system wherein an optical signal is transmitted through said optical fiber to another optical device, said method comprising forming a rounded end on said optical fiber by applying heat to soften and shape the end face of said optical fiber, said step of applying heat comprising directing a laser beam at the end face of said optical fiber, said step of directing a laser beam at the end face of said optical fiber comprising the steps of providing a parabolic reflector having a focal point, positioning said free end of said optical fiber at said focal point, and directing said laser beam axially of said fiber toward said parabolic reflector to reflect said laser beam from said parabolic reflector to said free end of the optical fiber, said parabolic reflector having an optical axis and including the step of positioning said optical fiber with its axis aligned with the optical axis of the parabolic reflector, and including the step of viewing said end face of said optical fiber at said parabolic reflector focal point, said step of viewing comprising the step of forming an aperture in said parabolic reflector and viewing said end face of said optical fiber through said aperture.

16. The method of claim 15 including a secondary viewing step comprising viewing said end face along an axis directed at said focal point and transverse to said optical fiber axis.

17. A method of finishing the end face of an optical fiber for use in an optical information system wherein an optical signal is transmitted from said optical fiber to another optical device, said method comprising the steps of:
mounting an optical fiber in a holding device, and
heating an end face of the fiber to form a smooth, rounded end face on the fiber,
said step of mounting the fiber comprising the steps of inserting the fiber into a ferrule and securing the fiber to the ferrule, said step of heating comprising providing a parabolic reflector having a reflector axis and a reflector focal point, positioning said fiber and ferrule in front of said reflector with said fiber facing said reflector and positioned at said focal point and with the axis of said fiber aligned with said reflector axis, and directing a laser beam along said reflector axis past said ferrule and fiber toward said reflector to be reflected from said reflector to said focal point and to said fiber end face, forming an aperture in a central portion of said reflector, and viewing said fiber end face through said aperture.

18. The system of claim 17 wherein said step of positioning said fiber and ferrule comprises forming a holder having a holder end face with an aperture therein for receiving a ferrule carrying a fiber therein, said holder end face including a stop for positioning a fiber carrying ferrule.

19. The method claim 18 wherein said holder has a transverse dimension that is significantly less than the transverse dimension of said expanded laser beam whereby said holder shadows only a small portion of said expanded beam as it illuminates said reflector.

* * * * *